United States Patent [19]

Isobe et al.

[11] 4,285,825
[45] Aug. 25, 1981

[54] METHOD OF PRODUCING MAGNETIC COATING MATERIAL FOR MAGNETIC RECORDING MEDIA

[75] Inventors: Yukihiro Isobe, Saku; Masashi Hayama, Usada; Kenji Hirabayashi, Tokyo, all of Japan

[73] Assignee: TDK Electronics Co., Ltd., Tokyo, Japan

[21] Appl. No.: 83,913

[22] Filed: Oct. 11, 1979

[30] Foreign Application Priority Data

Oct. 12, 1978 [JP] Japan .................................. 53/124690

[51] Int. Cl.$^3$ ........................... H01F 1/00; H01F 1/26; C04B 35/04
[52] U.S. Cl. ................................. 252/62.54; 427/128; 428/900

[58] Field of Search ................. 427/127–132, 427/48; 252/62.54; 428/900

[56] References Cited

U.S. PATENT DOCUMENTS

| 3,630,910 | 12/1971 | Akashi et al. | 252/62.54 |
| 3,687,725 | 8/1972 | Hartmann et al. | 117/235 |

*Primary Examiner*—Bernard D. Pianalto
*Attorney, Agent, or Firm*—Neuman, Williams, Anderson & Olson

[57] ABSTRACT

A magnetic coating material for magnetic recording media is produced by dispersing a magnetic coating material containing from 0.1 to 2.0% of an abrasive and from 0.05 to 1.0% of a betaine type ampholytic antistatic agent, both on the basis of the amount of a magnetic powder, in a dispersion mill using steel balls. The abrasive has a hardness of not lower than 6 on Mohs' scale.

3 Claims, 1 Drawing Figure

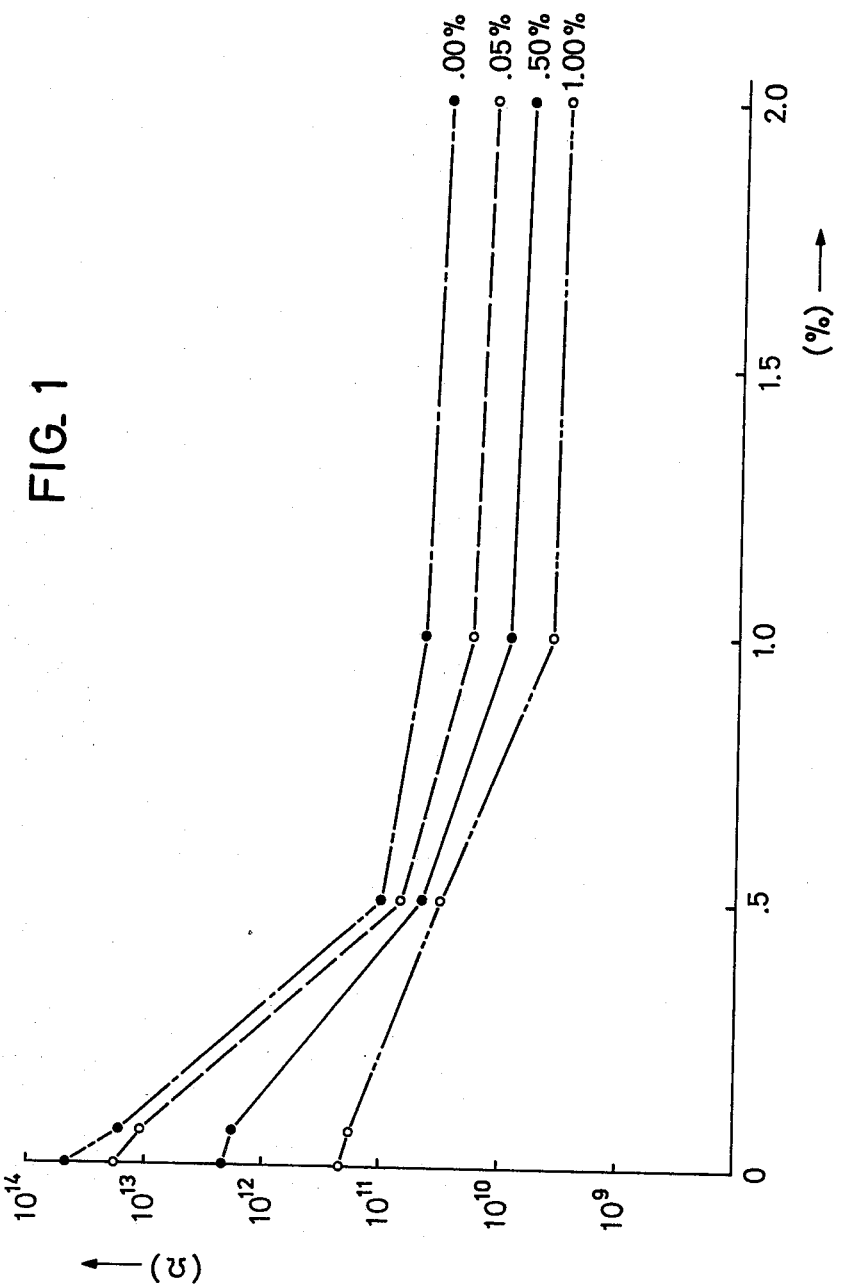

METHOD OF PRODUCING MAGNETIC COATING MATERIAL FOR MAGNETIC RECORDING MEDIA

BACKGROUND OF THE INVENTION

This invention relates to magnetic recording media such as tape, and more specifically to a method of producing a magnetic coating material for the recording media which is highly effective in reducing the electric resistances of the media and in avoiding various troubles which would otherwise result from static charge accumulation.

With adsorption of dust on its coating, the magnetic recording tape tends to develop troubles, e.g., dropouts and reductions in level due to choking of the head. The attraction of dust is ascribable to the buildup of static charge on the magnetic recording tape with frictional electricity produced as the tape runs in sliding contact with the guides, head, and associated parts of the recorder. In extreme cases it can cause a discharge noise.

Attempts to preclude such troubles have been made, including the incorporation of antistatic agents into or over the magnetic coating films, and addition of carbon black or metal powder to the coatings. However, those methods hitherto proposed have had one drawback or another. For example, the addition of the antistatic agents can cause blooming or degradation with the elapse of time. When carbon black or metal powder is used, tendencies toward low sensitivity and deterioration of the coated film are frequent problems. With metal powder in particular, these problems are pointed up because of the surface oxidation with air and a sufficiently large amount to make up for the loss must be used if an adequate antistatic effect is to be achieved.

THE SUMMARY OF THE INVENTION

As a result of intensive study of ways of minimizing the phenomena of static discharge accumulation having an important bearing upon the tone quality and other properties of magnetic recording material, it has now been found possible to reduce the electric resistance to such a degree that the influence of static charge buildup can be disregarded. Such reduction is affected by adding both an abrasive (with a hardness of preferably 6 or more on Mohs' scale), e.g., SiC, $Al_2O_3$, $Cr_2O_3$, $SiO_2$, $TiO_2$, $CeO_2$ or the like and a betaine type ampholytic antistatic agent to a magnetic coating, and dispersing them both into the latter by a dispersion mill, e.g., Attritor or a ball mill using steel balls as grinding media, which is usually used in preparing a magnetic coating material.

In accordance with the present invention, the abrasive wears down the surface of steel balls in the mill into minute particles during the preparation of the magnetic coating, thus providing the fine metal powder necessary to preclude the static charge accumulation. The abrasive alone would not impart an adequate antistatic effect, but only when it is used together with a betaine type ampholytic agent, the combination synergetically attains a satisfactory antistatic effect despite the smallness in proportion of the metal powder. As the antistatic agent the betaine type is desirable and, to our knowledge, there is no other type which can give a magnetic recording medium free of the above disadvantage and is capable of proving amply antistatic.

The abrasive is used in an amount between about 0.1% and about 2.0% based on the weight of magnetic powder used in a magnetic coating material. Decrease in the electric resistance is not sufficient of the magnetic recording medium produced from the magnetic coating material when less than 0.1% is used. On the other hand, the larger in the quantity of abrasive, the higher is the antistatic effect which is remarkably improved up to 1.0% and gradually reaches situation toward 2.0%. On the other hand, an increase in the amount of the abrasive accelerates the wear of a magnetic recording head and hence less than 2.0% is desirable.

The betaine ampholytic antistatic agent is effective when it is used about 0.01% based on the weight of magnetic powder used in a magnetic coating material. The antistatic effect is increased with the increase in the amount of the agent but more than about 1% tends to weaken the strength and the durability of magnetic medium formed from the coating material.

According to the present invention, the fine metal powder that originates from the steel balls is dispersed in the magnetic coating material without a chance of contacting air, so that a small amount of metal particles can be supplied (hence necessitating a correspondingly limited amount of the abrasive), the favorable effect of the fine powder being enhanced by the presence of the betaine type ampholytic antistatic agent.

BRIEF EXPLANATION OF THE FIGURE

In the accompanying drawing,

FIG. 1 is a graph indicating the antistatic effects achieved in accordance with the method of the invention for producing a magnetic coating material.

DETAILED EXPLANATION OF THE INVENTION

The invention will be described in more detail below in connection with examples thereof.

EXAMPLE 1

Needle-shaped magnetic particles of $\gamma$-$Fe_2O_3$ which is widely used in the manufacture of magnetic recording tapes, a vinyl chloride-vinyl acetate copolymer, an acrylonitrile-butadiene copolymer (NBR), a lecithin dispersant, and a solvent were mixed in the following proportions:

| | |
|---|---|
| $\gamma$-$Fe_2O_3$ | 100 parts |
| Vinyl chloride-vinyl acetate copolymer | 20 parts |
| NBR | 5 parts |
| Dispersant | 2 parts |
| Solvent | 200 parts |

To the resulting composition were added carborundum (SiC with a hardness of 9 on Mohs' scale) as an abrasive and a betaine type ampholytic antistatic agent (marketed under the trade designation "Anone BF" by Nippon Oils & Fats Co.) in amounts of 0–2% and 0–1%, respectively, on the basis of the amount of the magnetic powder. The components were dispersed in the mixture within a Red Devil mill packed with steel balls for about two hours. The coating material thus prepared was applied on a polyester film to form a layer six microns thick. After drying, the coated film was cut into a test strip 6.3 mm in width and 5 cm in length to determine its electric resistance.

FIG. 1 shows changes in electric resistance with the addition of carborundum and antistatic agent. As can be seen from the graph, the electric resistance is reduced by the addition of carborundum itself but is more effectively decreased when the abrasive is combined with the antistatic agent. Also it is clear that the addition of more than one percent carborundum retards the tendency toward lower electric resistance, and yet its combination with the antistatic agent permits further decrease in the resistance.

EXAMPLE 2

Silicon oxide ($SiO_2$, with a hardness of 7 on Mohs' scale), titanium oxide ($TiO_2$, 6–7 on Mohs' scale), or cerium oxide ($CeO_2$, 6 on Mohs' scale) or the like, which are all of far lower hardnesses than carborundum and a betaine type ampholytic antistatic agent were added to the same composition as used in Example 1, and the electric resistance of each test strip was determined by the same procedure.

Table 1 gives the electric resistance values recorded when the above-mentioned abrasives were employed alone or together with the betaine type ampholytic antistatic agent. The effectiveness of the combinations is more pronounced than when the abrasives alone are used. This is because, unlike the carborundum of Example 1, these low hardness substances scarcely grind the steel balls as media and, even with the addition of one percent of such an abrasive to the magnetic powder, the electric resistance will remain on the order of $10^{13}\Omega$, or will remain close to the value without the addition of the abrasive. By contrast, the addition of one percent betaine type ampholytic antistatic agent ("Anone BF"), too, to the magnetic powder will lower the resistance value to the order of $10^{10}\Omega$. The values thus obtained are lower than with the addition of the antistatic agent alone by about one order.

TABLE 1

| Amount of Anone BF added (%) | Effects of antistatic agent with various abrasives (in $\Omega$) (Amount of abrasive added is 1.0%) | | |
|---|---|---|---|
| | Abrasive | | |
| | $SiO_2$ ($\Omega$) | $TiO_2$ ($\Omega$) | $CeO_2$ ($\Omega$) |
| 0.0 | $2 \times 10^{13}$ | $5 \times 10^{13}$ | $3 \times 10^{13}$ |
| 1.0 | $1 \times 10^{10}$ | $4 \times 10^{10}$ | $4 \times 10^{10}$ |

COMPARISON EXAMPLE

The procedure of Example 2 was repeated except that the betaine type ampholytic antistatic agent was replaced by one percent of an agent of the other type i.e., one of nonionic antistatic agents (marketed under the trade designation "Resistat 141" by Daiichi Kogyo Seiyaku Co. and under the trade names "Elest N" and "Elest TS-2" by Kao Soap Co.). Again by the same procedure, test pieces were made and their electric resistance values were determined. The values were of the order of $10^{12}\Omega$, or by far the greater than the order of $10^{10}\Omega$ attained in accordance with the invention. It was confirmed from these results that the betaine type ampholytic antistatic agent combines with the metal powder originating from the ball mill to exert a synergetic effect.

As described hereinabove, the simultaneous addition of one of various abrasives and a betaine type ampholytic antistatic agent to a magnetic coating material, with the subsequent process of dispersion through the agency of steel balls, makes possible a decrease in the electric resistance of the product to a practically unobjectionable value. This is beneficial in that the wear of the magnetic head that has been inevitable with the use of abrasive can be reduced to a large extent, because the proportion of the abrasive to be used in reducing the electric resistance is small and also because abrasives not so hard as the ordinary ones may be employed. Moreover, with the limited use of the antistatic agent, the produce can have extended life.

The decrease in electric resistance as a result of the combined use of the abrasive and betaine type ampholytic antistatic agent may be explained as below. First, during the dispersion of the magnetic coating material, the motion of the steel balls enables the abrasive to wear down the ball surface slightly, producing fine, electrically conductive particles and allowing them to disperse into the coating composition. These fine particles remain in the resulting coated film. However, if they are to confer electric conductivity on the film, the particles have to be present in an amount large enough to be in contact or lie very close to one another. Practically, this requirement has hitherto been met by using a large amount of a hard abrasive. The advantageous effect attained in accordance with the invention by the combined use of a betaine type ampholytic antistatic agent and an abrasive is presumably ascribable to the fact that the antistatic agent acts as a carrier of the electric charge among the ground electrically conductive substances, thus leading to an improved conductivity of the tape as a whole. In this case, therefore, the conductive particles may lie apart from one another to achieve the afore-described effect.

Since an increase in the amount of the abrasive accelerates the wear of the head, not more than two percent adhesive is desirable. As for the antistatic agent, not more than one percent gives good durability.

What is claimed is:

1. A method of producing a magnetic coating material for magnetic recording media, which comprises the steps of charging a mixture of a magnetic powder and a binder composition containing from about 0.1 to about 2.0% of an abrasive and from about 0.05 to about 1.0% of a betaine type ampholytic antistatic agent, both on the basis of the amount of a magnetic powder, together with steel balls and dispersing said mixture; said abrasive having a hardness of not lower than 6 on Mohs' scale.

2. A method for producing a degradation-resistant magnetic coating material for recording media comprising the steps of charging into a steel ball mill containing steel balls, a magnetic powder, a binder composition containing about 0.1% to about 2.0% of an abrasive having a Mohs' hardness of not less than 6 based on the weight of said megnetic power, and about 0.05 to about 1.0% of a betaine type ampholytic antistatic agent based on the weight of said magnetic powder, and dispersing said mixture in said mill.

3. The method of claims 1 or 2 in which said abrasive is selected from the group consisting of SiC, $Al_2O_3$, $Cr_2O_3$, $SiO_2$, $TiO_2$ and $CeO_2$.

* * * * *